US006904363B2

(12) United States Patent
Inbar et al.

(10) Patent No.: US 6,904,363 B2
(45) Date of Patent: Jun. 7, 2005

(54) SYSTEM FOR LOCAL MONITORING

(76) Inventors: Iris Inbar, 20872 Channel Ct., Sterling, VA (US) 20165; William T. Brown, 671 N. Main St., Celina, OH (US) 45822; James W. Morton, 10218 Summer House Ct., Charlotte, NC (US) 28210

( * ) Notice: Subject to any disclaimer, the term of this patent is extended or adjusted under 35 U.S.C. 154(b) by 128 days.

(21) Appl. No.: 10/223,603

(22) Filed: Aug. 20, 2002

(65) Prior Publication Data

US 2004/0039526 A1 Feb. 26, 2004

(51) Int. Cl.[7] .......................... G01C 21/00; G06F 19/00

(52) U.S. Cl. .................. 701/213; 701/207; 342/357.07; 455/457

(58) Field of Search ............................ 701/1, 207, 213; 455/456, 457; 342/357.07; 340/426.1, 426.11–426.22; 180/287

(56) References Cited

U.S. PATENT DOCUMENTS 5,731,757 A * 3/1998 Layson, Jr. .............. 340/573.1
5,919,239 A * 7/1999 Fraker et al. ................. 701/35
6,014,080 A * 1/2000 Layson, Jr. .............. 340/573.1
6,154,727 A * 11/2000 Karp et al. ..................... 705/3
6,243,039 B1 * 6/2001 Elliot .......................... 342/457
6,421,001 B1 * 7/2002 Durst et al. ............ 342/357.07
6,441,778 B1 * 8/2002 Durst et al. ............ 342/357.07
6,518,919 B1 * 2/2003 Durst et al. ............ 342/357.07
6,591,242 B1 * 7/2003 Karp et al. ..................... 705/2

* cited by examiner

*Primary Examiner*—Gary Chin
(74) *Attorney, Agent, or Firm*—The Patent Source

(57) ABSTRACT

One embodiment of the present invention relates a method of monitoring. Position information related to a notification point is received. A mobile client determines a position of the mobile client. The position is compared with an area encompassing the mobile client. A message is transmitted in response to the position being within the area encompassing the notification point.

27 Claims, 6 Drawing Sheets

100

SYSTEM FOR LOCAL MONITORING

FIELD OF THE INVENTION

The present invention relates generally to monitoring, in particular the invention relates to monitoring of position.

DESCRIPTION OF THE RELATED ART

A wide variety of tasks are performed using vehicles. These tasks often include pickup and delivery of persons and/or goods. It is sometimes desirable to have a record of the time and place of the performance of these tasks. Various conventional methods exist for creating such records. An example of a conventional method is a simple handwritten log kept by drivers of the vehicle, such as those commonly used by truck drivers.

However, these conventional methods may have disadvantages and drawbacks. More particularly, one of the disadvantages of existing systems for recording a vehicle's position is that they generally require manual action on the part of the dispatcher or wait for a pre-defined time to arrive. This can result in the recording of irrelevant information or the omission of information, either unintentionally or intentionally.

Along with monitoring tasks, knowledge of the position of the vehicle may be advantageous. For instance, the ability to track a vehicle may help assist a coordinator to send assistance to a disabled vehicle. In general, there are various positioning systems which have been used for determining the location of a vehicle. These include LORAN systems and Global Positioning Systems (GPS). These systems rely on externally transmitted radio frequency signals to calculate the location of a receiving antenna mounted on the vehicle. In LORAN systems, this calculation is based on the time difference in signals received from multiple transmitters. Because the latitude and longitude of the transmitters are known, the distance from two or more transmitters can be calculated from the time lag between the reception of the plurality of signals. The resulting calculation can determine the latitude and longitude of the receiving antenna to within approximately plus or minus 20 feet.

In the GPS navigation system, the transmitters are positioned on orbiting satellites. Time and location information of the satellites plus the Doppler shift of the radio frequency signal received from the satellite is used to calculate the location of the receiver. GPS systems can determine location with even greater accuracy than LORAN systems.

However, the existing positioning systems are not particularly useful for tracking the location of a vehicle during predetermined events. This is because they are generally designed for the purpose of informing an operator of the vehicle of his current location.

SUMMARY OF THE INVENTION

One embodiment of the invention relates to a method of monitoring. The method includes receiving position information related to a notification point and determining a position of a mobile client by the mobile client. The method also includes comparing the position with an area encompassing the notification point and transmitting a message in response to the position being within the area encompassing the notification point.

Another embodiment of the present invention pertains to a method of locally monitoring position. The method includes receiving a plurality of waypoints and determining a position of a client by the client. The method also includes comparing the position of the client to a selected waypoint of the plurality of waypoints and transmitting a message in response to the position of the client being within a first circle encompassing the selected waypoint.

Yet another embodiment of the invention relates to a method of locally monitoring a client. The method includes receiving a plurality of waypoints and determining a position of the client. The method also includes comparing the position of the client to a selected waypoint of the plurality of waypoints, and transmitting a message in response to the position of the client being within a first circle encompassing the selected waypoint.

Yet another embodiment of the present invention pertains to a system for locally monitoring. The system includes a client, a proximity module configured to execute on the client, a global positioning system (GPS) module configured to interface with the proximity module, and a host system. The host system is configured to transmit a selected location or a plurality of locations to the proximity module. The proximity module is configured to receive the selected location or plurality of locations and to determine a position of the client from the GPS module. The proximity module is also configured to compare the position of the client with the selected location or a selected location within the plurality of locations and to transmit a message to the host system in response to the position of the client being within an area encompassing the selected location.

Yet another embodiment of the invention relates to an apparatus for monitoring. The apparatus includes means for receiving position information related to a notification point and means for determining a position of a mobile client by the mobile client. The apparatus also includes means for comparing the position with an area encompassing the notification point and means for transmitting a message in response to the position being within the area encompassing the notification point.

BRIEF DESCRIPTION OF THE DRAWINGS

Various features of the present invention can be more fully appreciated as the same become better understood with reference to the following detailed description of the present invention when considered in connection with the accompanying figures, in which.

DETAILED DESCRIPTION OF A PREFERRED EMBODIMENT

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention. Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment of the present invention, a proximity module is configured to determine the position of a mobile client in relation to a predefined location. More particularly, the proximity module may receive a configuration message when activated by a host communication system. The configuration message comprises positional information (e.g., latitude/longitude coordinates, destination radius, tolerance radius, etc.) relating to at least one predefined locations (e.g., notifications points, waypoints, destinations, etc.).

The proximity module may also be configured to obtain position information of the mobile client from a GPS module. The proximity module may then calculate the position of the mobile client in relation to the predefined locations. For example, the proximity module may use the received position information, i.e., latitude-longitude, and determine whether the mobile client is within a destination circles formed around the predefined locations.

Figure 1:
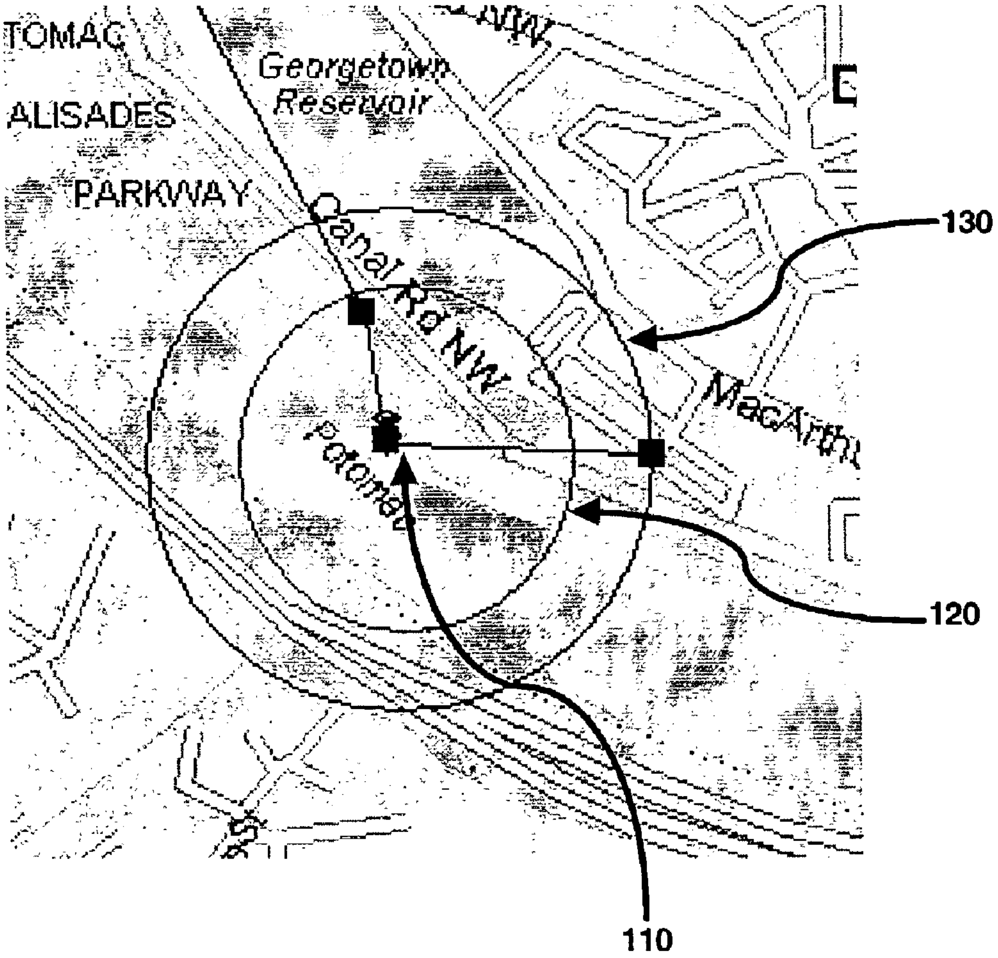
FIG. 1 illustrates an embodiment of the present invention.

An embodiment of the present invention is illustrated in FIG. 1. As shown in FIG. 1, the map 100 includes a pre-defined location 110. Although only one predefined location 110 is shown in FIG. 1, multiple predefined locations are also contemplated in other embodiment of the present invention and are within the scope of the present invention.

The predefined location 110 is transmitted to a vehicle in a latitude/longitude format. A destination circle 120 may be formed around the predefined location 110 with the predefined location 110 as the center of the destination circle. The radius of the destination circle 120 may be user-specified or set by a default setting. A tolerance circle 130 may also be formed around and centered on the predefined location 110. In one embodiment of the present invention, the radius of the tolerance circle 130 is larger than the radius of the destination circle 120. The radius of the tolerance circle may also be user-specified or set by a default setting. The predefined location 110, the radii of the destination circle 120 and the tolerance circle 130 may be forwarded to the mobile client in the configuration message.

In an embodiment of the invention, when a mobile client enters the destination circle 120, the mobile client sends a message to a host. While the mobile client is within the destination circle 120, the mobile client transmits a second message notifying the host communication system that the mobile client is still within the destination circle 120. When mobile client leaves a tolerance circle 130, the mobile client transmits a third message notifying the host communication system that the mobile client has left the predefined location 110.

Accordingly, a user of the host communication system may become aware of when a mobile client enters the proximity of a selected location. The user may also be informed of the length of time the mobile client spends in the selected location. Furthermore, the user of the host system may be informed when the mobile client leaves the selected location.

Figure 2:
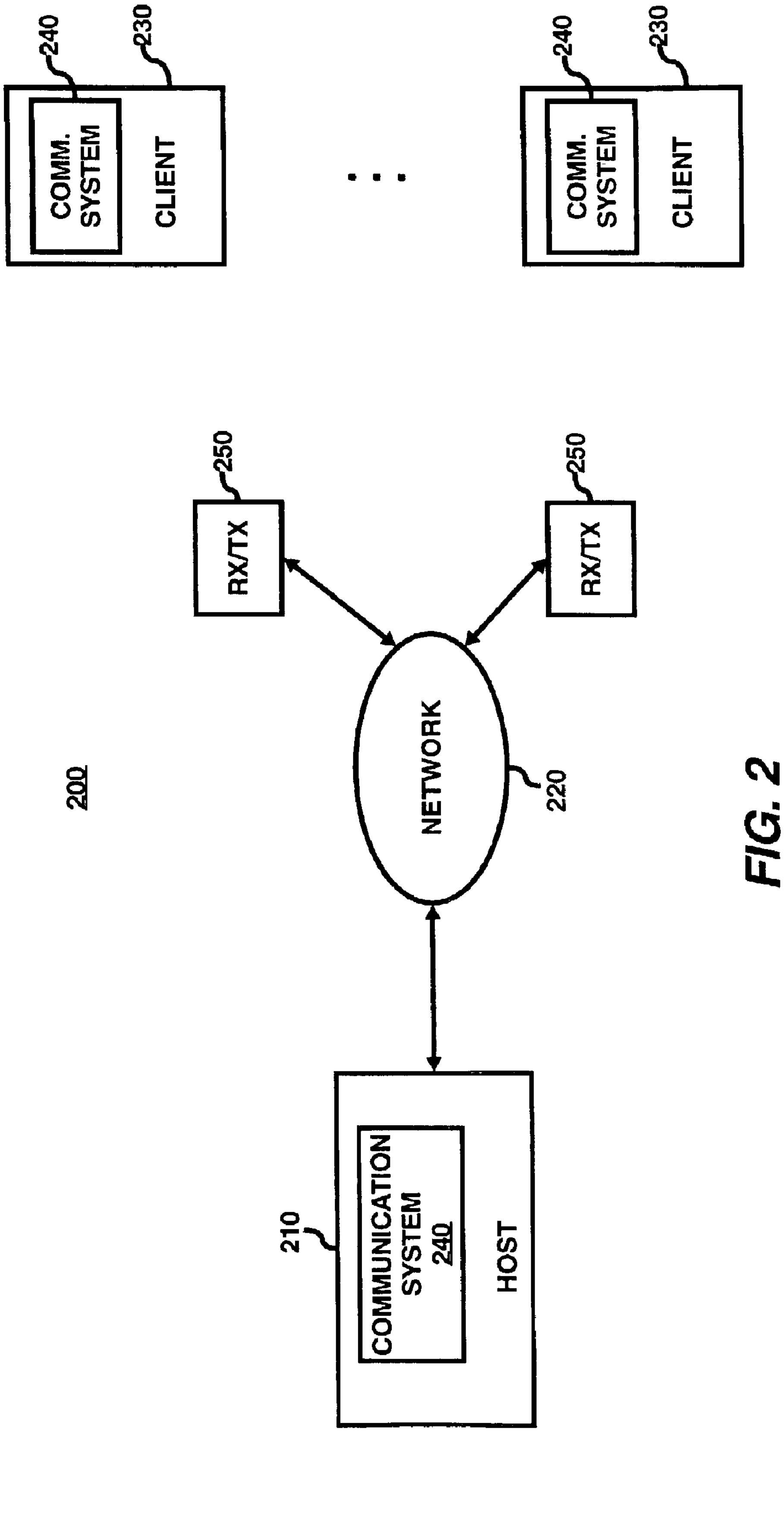
FIG. 2 illustrates an embodiment of a system in accordance with an embodiment of the present invention.

FIG. 2 illustrates an exemplary system 200 where an embodiment of the invention may be practiced. Although FIG. 2 illustrates an exemplary embodiment of the system 200, it should be readily apparent to those of ordinary skill in the art that FIG. 2 represents a generalized schematic illustration of the system 200 and that other components may be added or existing components may be removed or modified without departing from the spirit or scope of the present invention.

As shown in FIG. 2, the system 200 includes a host 210, a network 220, and clients 230. The host 210 may be configured to monitor, track, and collect information about the clients 230 over the network 220. The host 210 may also be configured to provide a communication system 240 to provide a mechanism for the monitoring, tracking and collection of information as well as provide a two-way communication channel between the host 210 and the clients 230. The host 210 may be implemented by electronic devices such as personal computers, workstations, servers, and other similar devices. An example of the communication system 240 may be the AETHER SYSTEMS MobileMAX2™. It should be readily apparent to those skilled in the art that other communication software that provide for similar functionality of the communication system 240 may be implemented by the host 210.

The host 210 may be further configured to interface with the network 220. The network 220 may be configured to provide a communication channel between the host 210 and the clients 230. The network 220 may be implemented as a private network, a public network (e.g., the Internet, public switched telephone network, etc.) or a combination thereof. The host 210 may interface with the network 220 over wired (e.g., modem, digital subscriber lines, Internet, etc.) or wireless (e.g., WAP, IEEE 802.11, etc.,) interfaces.

The network 220 may also be configured to interface with transceivers 250 (e.g., antennas, satellites, etc.) The transceivers 250 (labeled RX/TX in FIG. 2) are configured to broadcast signals to and receive signals from the clients 130. The transceivers 250 are also configured to provide coverage over a wide geographic area.

The clients 230 may be mobile units that are to be monitored by the host 210. The clients 230 may comprise a complementary transceiver (not shown) to interface with transceivers 250 in order to provide a communication link to the host 210. The clients 230 may be configured to execute a client version of the communication system 240 in order to provide the functionality of monitoring, tracking, data collection, and communication services. Examples of clients 230 may be wireless telephones, personal digital assistants, laptops, automobiles, trucks, airplanes, boats, etc.

In one embodiment of the invention, the communication system 240 may include a proximity module (not shown). The proximity module, once activated, may be configured to provide an indication of when client 230 nears a selected notification point (e.g., a location point, waypoint, destination, etc.). The proximity module may also be configured to provide a frequent indication of how long the client 230 is near the notification point and an indication of when the client 230 leaves the proximity of the notification point.

Figure 3:
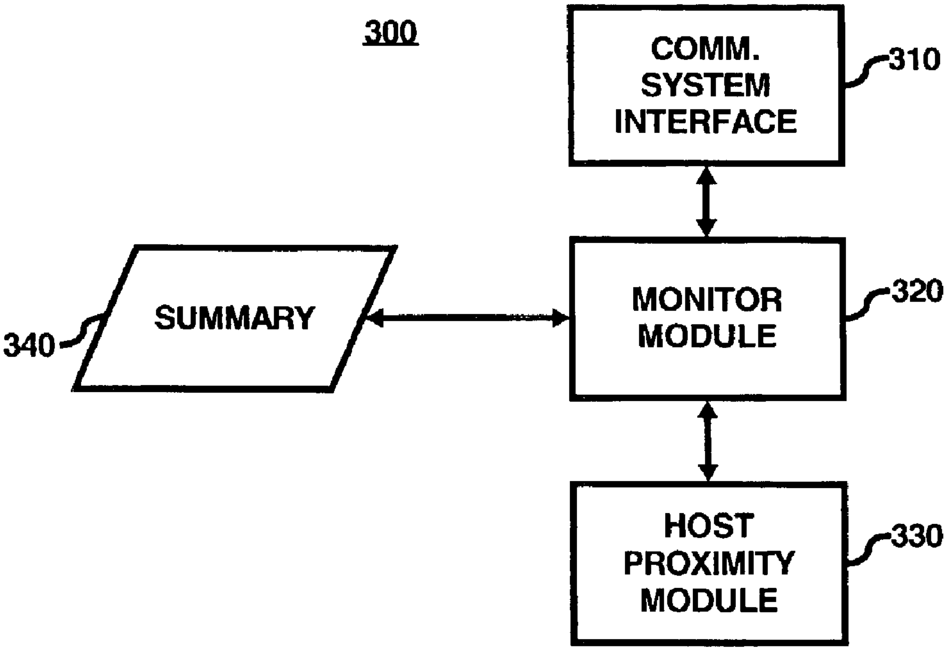
FIG. 3 illustrates a block diagram of an architecture of a host system shown in FIG. 2 in accordance with an embodiment of the present invention.

FIG. 3 illustrates a block diagram of an architecture 300 of communication system 240 shown in FIG. 2 executing on host 210 in accordance with an embodiment of the present invention. As shown in FIG. 3, the architecture 300 may include the communication system interface 310, a monitor module 320, a host proximity module 330, and a summary 340. Although FIG. 3 illustrates one embodiment of the architecture 300, it should be readily apparent to those of ordinary skill in the art that FIG. 3 represents a generalized schematic illustration of the architecture 300 and that other components may be added or existing components may be removed or modified without departing from the spirit or scope of the present invention. Moreover, the components of architecture 300 may be implemented in hardware, software or combinations thereof.

As shown in FIG. 3, the communication system interface 310 may be configured to provide a communication channel to the communication system 240 (shown in FIG. 2). The communication system interface 310 may provide a mechanism where data and/or commands are passed between the communication system 240 and the monitor module 320. The communication system 240 may be implemented as a hardware interface (e.g. bus interface), software interface (e.g., an application program interface) or a combination thereof.

The monitor module 320 may be configured to provide an interface for the user to activate the monitoring, tracking and/or data collection functions when invoked by action from a user of the communication system 240. For example, if the communication system 240 is used to monitor and communicate with a fleet of vehicles, the monitor module 320 may collect information such as mileage, state crossings, idle time, location, etc. The collected information may be stored in the summary 340. The user may then process the collected information to extract relevant information such as mapping of the location of clients 130, driver performance summaries, fleet summaries, etc.

The monitor module 320 may also be configured to display menus, dialog boxes, screen interfaces or combinations thereof, i.e., the graphical user interface, to enable a user to select the types of information to collect from the client 230. From the monitor module 320, the user may invoke the host proximity module 330.

The host proximity module 330 may be configured to provide a mechanism to select a plurality of notification points for a particular client. More particularly, the host proximity module 330 may provide a graphical user interface for a user to invoke the host proximity module 330. The graphical user interface may be a mechanism for the user to create (or enter) notification points (e.g., location points, waypoints, destination points, etc.) for a selected client. Each notification point may be specified by latitude/longitude, by referencing to database of location or map, or other similar methods of information transfer.

Along with each notification point, a radius for a destination circle (e.g., destination circle 120 in FIG. 1) and for a tolerance circle (e.g., tolerance circle 130 in FIG. 1) may be specified by the user. The destination circle may encompass and be centered on the respective notification point. When the client determines that the client has crossed into the destination circle, the proximity module on the client may be configured to transmit a message (e.g., message type 1) notifying the host that the client is near to the notification point and to set an entrance flag.

While the client is within the destination circle, the proximity module may be configured to transmit a message (e.g., a message type 2) at a specified frequency to the host system. The frequency may be set by a user at the host system and is transmitted along with the information relating to the notification points.

The tolerance circle may also encompass and be centered on the respective notification point. When the client determines that the client is not within the tolerance circle and the entrance flag is set, the host system 210 may receive a message (e.g., message type 3) indicating that the client has left the vicinity of the notification point from the proximity module of the client.

Figure 4:
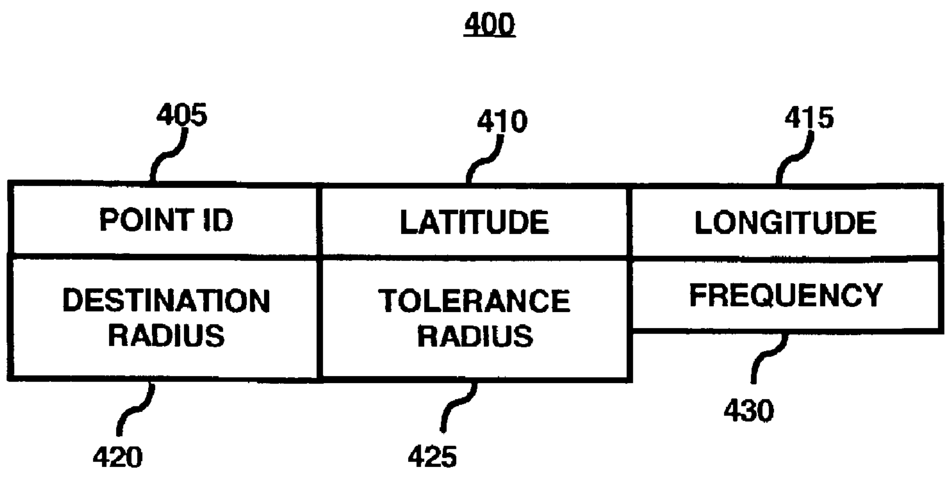
FIG. 4 illustrates a format of a configuration message transmitted from the host proximity module to the proximity module of the client in accordance with an embodiment of the invention.

FIG. 4 illustrates a format of a message 400 transmitted from the host proximity module to the proximity module of the client in accordance with an embodiment of the invention. As shown in FIG. 4, the message 400 includes a point identification field 405, a latitude field 410, a longitude field 415, a destination radius field 420, a tolerance radius field 425, and a frequency field 430. It should be readily apparent to those of ordinary skill in the art that FIG. 4 represents a generalized schematic illustration of the message 400 that other fields may be added or existing fields may be removed or modified without departing from the spirit or scope of the present invention.

The point identification field 405 may be configured to provide a label for a selected notification point. The values in the point identification field 405 may range from 1 to 65535. However, the values may range to larger or smaller values depending on the needs of a particular user.

A value in the latitude field 410 may be configured to indicate the latitude coordinate of a selected notification point. A value in the longitude field 415 may be configured to indicate the longitude coordinate of a selected notification point. A value in the destination radius field 420 indicates the length (e.g., in miles, kilometers, etc.) of the circular area encompassing and centered on the selected notification point. A value in the tolerance radius field 425 may indicate the length (e.g., miles, kilometers, etc.) of the circular area encompassing and centered on the selected notification point. It should be noted that the value of the tolerance radius field 425 is larger than the value of the destination radius field 420. A value in the frequency 430 may indicate that the frequency of transmission of the message that indicates the client 230 is within the destination circle.

Returning to FIG. 3, the summary module 340 may be configured to provide a storage area for information received by the host system 210. The summary module 340 may be implemented as a relational database, a file, or other similar data structure.

Figure 5:
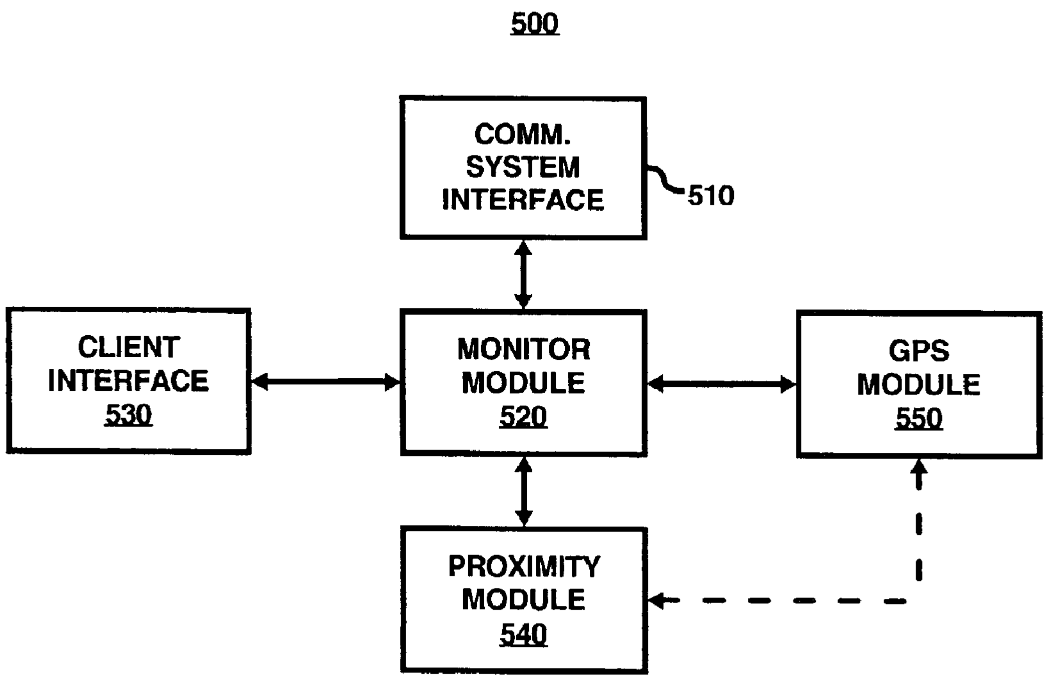
FIG. 5 illustrates a block diagram of an architecture of a client system shown in FIG. 2 in accordance with an embodiment of the present invention.

FIG. 5 illustrates a block diagram of an architecture 500 of communication system 240 shown in FIG. 2 executing on client 230 in accordance with an embodiment of the present invention. As shown in FIG. 5, the architecture 500 may include the communication system interface 510, a monitor module 520, a client interface 530, a proximity module 540, and a global position system (GPS) module 550. Although FIG. 5 illustrates an embodiment of the architecture 500, it should be readily apparent to those of ordinary skill in the art that FIG. 5 represents a generalized schematic illustration of the architecture 500 and that other components may be added or existing components may be removed or modified without departing from the spirit or scope of the present invention. Moreover, the components of architecture 500 may be implemented in hardware, software or combinations thereof.

As shown in FIG. 5, the communication system interface 510 may be configured to provide an interface for passing commands and/or data between the monitor module 520 and the communication system 240 (shown in FIG. 2). The communication system interface 510 may be implemented as an application program interface, a pipe, a function call, etc.

The monitor module 520 may be configured to collect information to transmit to the host system 210 through the communication system interface 510. The monitor module 520 may be further configured to have a client interface 530. The client interface 530 may provide a communication conduit in order to query (or request) the requested information. For example, if the client 230 is a truck, the requested information may be mileage, gasoline consumed, idling time, etc. For the truck, the client interface 530 may be implemented with a J1587 (also known as J1708) bus.

The monitor module 520 may be further configured to interface with the proximity module 540. The proximity module 520 may be configured to activate in response to a command transmitted from the host system 210 (shown in FIG. 2). The proximity module 520 may also be configured to interface with the GPS module 550, either indirectly through the monitor module 520 or directly. The GPS module 550 may be configured to provide latitude/longitude position of the client 230 through the GPS satellites.

The proximity module 520 may be configured to determine to alert the host system 210 when the client 230 nears the notification points by processing the received latitude-longitude of the current position of the client 230. The proximity module 520 may also be configured to indicate the length of time the client spends near the notification points as well when the client leaves the tolerance circle.

Figure 6:
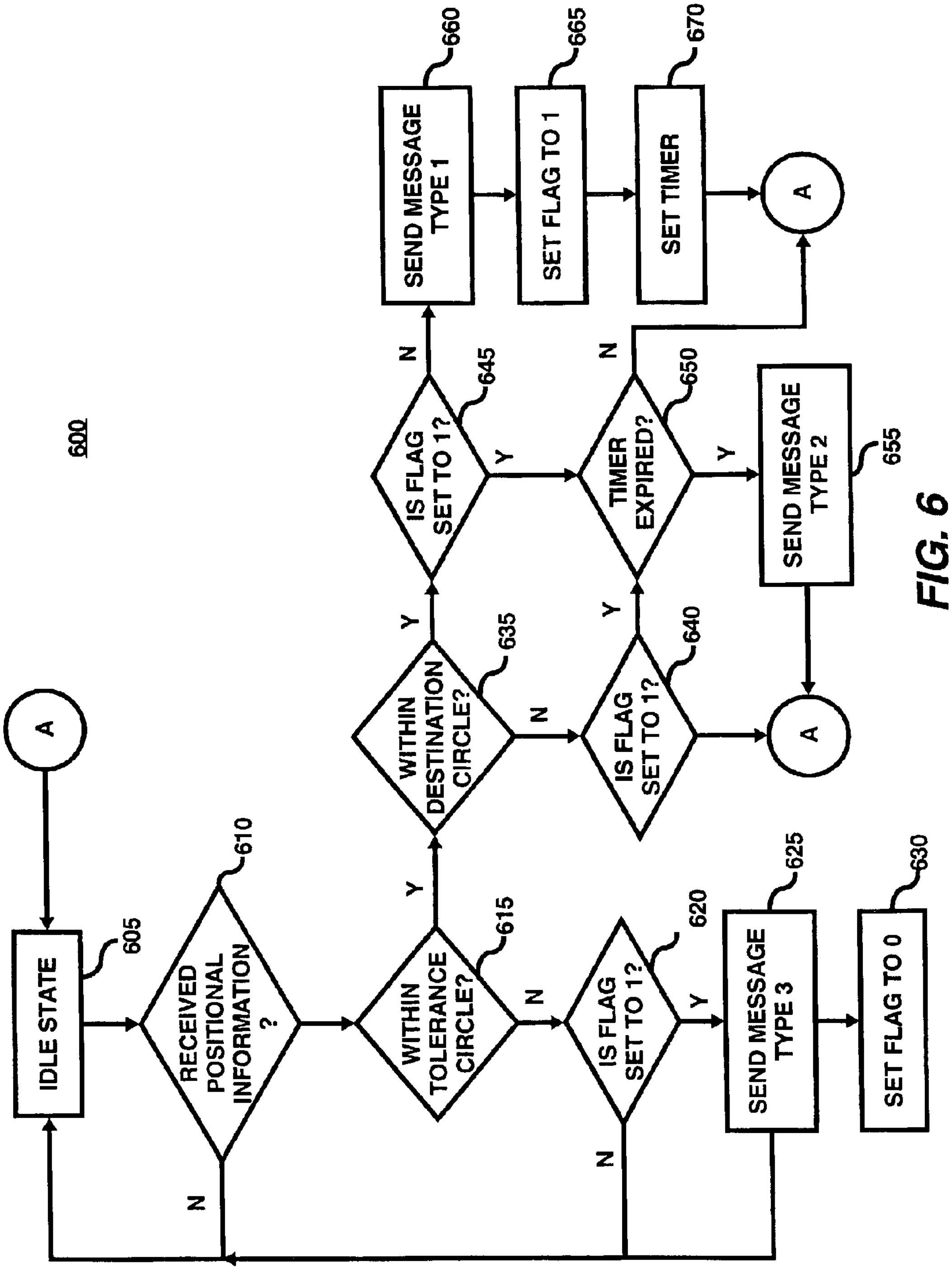
FIG. 6 illustrates a flow diagram for a method for the proximity module shown in FIG. 1 in accordance with an embodiment of the present invention.

FIG. 6 illustrates a flow diagram for a method 600 for the proximity module 540 shown in FIG. 5 in accordance with an embodiment of the present invention. It should be readily apparent to those of ordinary skill in the art that the method 600 depicted in FIG. 6 represents a generalized illustration and that other steps may be added or existing steps may be removed or modified without departing from the spirit or scope of the present invention.

As shown in FIG. 6, after activation, the proximity module 540 may be configured to be an idle state, in step 605. The proximity module may be configured to receive positional information (e.g., latitude/longitude) of the current position of the client 230, in step 610.

The proximity module 540 may be configured to compare the received positional information with the area of the tolerance circle of a selected notification point, in step 615. If the comparison determines that the current position of the client is not within the area of the tolerance circle, the proximity module 540 may be configured to determine the state of a flag, in step 620. Otherwise, if the comparison determines that the current position of the client 230 is within the area of the tolerance circle, the proximity module 540 moves to the processing of step 635, which is discussed below.

Returning to step 620, if the determination of the state of an entrance flag determines that the entrance flag is unset, the proximity module 540 returns to the idle state of step 605. The entrance flag is an indicator of whether the client 230 has previously entered into the destination circle of the selected notification point. Otherwise, if the state of the entrance flag is set, the proximity module 540 may be configured to send a message to the host system 210, in step 625. The message may indicate to the host system 210 that the client 230 has left the vicinity of the selected notification point. Then, the proximity module 540 may be configured to reset the state of the entrance flag, in step 630. Subsequently, the proximity module 540 may be configured to return to the idle state of step 605.

Returning to step 635, the proximity module 540 may be configured to determine whether the current position of the client is within the destination circle. If the client is not within the destination circle, the proximity module 540 may be configured to determine the state of the entrance flag, in step 640. If the state of the entrance flag is set, the proximity module 540 may be configured to move to the processing of step 650, which is described below. Otherwise, if the state of the entrance flag is unset, the proximity module 540 may be configured to return to the idle state of step 605.

Returning to step 635, if the proximity module 540 determines that the client is within the destination flag, the proximity module 540 may be configured to determine the state of the entrance flag, in step 645. If the state of the entrance flag is set, the proximity module 540 may be configured to determine whether a timer has expired, in step 650. If the timer has expired, the proximity module 540 may be configured to send another message. The second message indicates that the client is still within the vicinity of the selected notification point, in step 655. Subsequently, the proximity module 540 may return to the processing of step 605. Otherwise, returning to step 650, if the timer is un-expired, the proximity module 540 may be configured to return to the idle state of step 605.

Returning to step 645, if the state of the entrance flag is unset, the proximity module 540 may be configured to transmit yet another message to the host system, in step 660. This third message indicates to the host system 210 that the client 230 has entered the vicinity of the selected notification point, where the vicinity may be the area encompassing and centered on the selected notification point by the destination circle radius.

In step 665, the proximity module 540 may be configured to set the state of the entrance flag. The proximity module 540 may also be configured to set the timer to the time indicated by the frequency field 430 of message 400 (shown in FIG. 4), in step 670. Subsequently, the proximity module 540 may be configured to return to the idle state of 605.

A computer program may implement the modes of operations of the proximity module as described herein above. The computer program can exist in a variety of forms both active and inactive. For example, the computer program and objects can exist as software comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium.

What has been described and illustrated herein is one embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of monitoring, comprising:

receiving position information related to a notification point;

determining a position of a mobile client by said mobile client;

setting a state of a flag to a value representing that the flag is set in response to said position being within an area encompassing said notification point;

comparing said position with said area encompassing said notification point;

transmitting message in response to said position being within said area encompassing said notification point;

determining a second position of said mobile client by said mobile client;

comparing said second position with a second area encompassing said notification point; and transmitting another message in response to said second position being outside of said second area encompassing said notification point and said state of said flag being set.

2. The method according to claim 1, wherein a radius of said second area is larger than a radius of said area.

3. The method according to claim 1, further comprising:

setting said state of said flag so a value representing that the flag is not set in response to said second position being outside of said second area encompassing said notification point and said state of said flag being set.

4. The method according to claim 1, further comprising:

specifying a second radius associated with said second area; and transmitting said second radius along with said position information of said notification point.

5. The method according to claim 1, further comprising:

initiating a timer.

6. The method according to claim 5, further comprising:

determining a subsequent position of said mobile client by said mobile client;

comparing said subsequent position with said area encompassing said notification point;

determining a status of said timer; and transmitting another message in response to said subsequent position being within said area encompassing said notification point and said status of said timer being expired.

7. The method according to claim 5, further comprising:

specifying a length of said timer; and transmitting said length of said timer along with said position information of said notification point.

8. The method according to claim 1, further comprising:

specifying a radius associated with said area; and transmitting said radius along with said position information of said notification point.

9. A method of locally monitoring position, comprising;

receiving a plurality of waypoints;

determining a position of a client by said client;

setting a state of a flag to a value representing that the flag is set in response to said position of said client being within a first circle encompassing a selected waypoint;

comparing said position of said client to said selected wavepoint of said plurality of waypoints;

transmitting a message in response to said position of said client being within said first circle encompassing said selected waypoint:

determining a subsequent position of said client by said client in response to said position of said client being within said fist circle encompassing said selected waypoint;

comparing said subsequent position with a second circle encompassing said selected waypoint; and transmitting another message in response to said subsequent position being outside of said second circle encompassing said selected waypoint and said state of said flag being set.

10. The method according to claim 9, further comprising:

setting said state of said flag to a value of unset in response to said subsequent position being outside of said second circle encompassing said selected waypoint and said state of said flag being set.

11. The method according to claim 9, further comprising:

specifying a respective radius of a respective first circle for each waypoint of said plurality of waypoints;

specifying a respective radius of a respective second circle for each waypoint of said plurality of waypoints; and transmitting said respective radius of said first circle and maid respective radius of said second circle for each waypoint of said plurality of waypoints along with said plurality of waypoints.

12. A method of locally monitoring a client, said method comprising:

receiving a plurality of waypoints;

determining a position of said client;

comparing said position of said client to a selected waypoint of said plurality of waypoints;

transmitting message in response to said position of said client being within a first circle encompassing said selected waypoint;

determining a state of a flag associated with said selected waypoint; and determining a subsequent position of said client in response to said flag having a value representing that said flag is not set.

13. A system for locally monitoring, said system comprising:

a client;

a proximity module configured to be executed on said client;

a global positioning system (GPS) module can be geared to interface with said proximity module;

a host system configured to transmit a selected location to said proximity module; wherein said proximity module is configured to receive said selected location, to determine a position of said client from said GPS module, to compare said position of said client with said selected location and to transmit a message to said host system in response to said position of said client being within a first area encompassing said selected location; and wherein said proximity module is further configured to compare said position of said client with a second area encompassing said selected location in response to said position of said client being within said first area encompassing said selected location and to check a status of the flag associated with said selected location in response to said position of said client being within said second area encompassing said selected location.

14. The system according to claim 13, wherein said proximity module is further configured to transmit said message in response to said state of said flag having a value representing that said flag is not set.

15. The system according to claim 14, wherein said proximity module is further configured to set said state of said flag so a value representing that said flag is set.

16. The system according to claim 15, wherein said proximity module is further configured to initiate a timer.

17. The system according to claim 13, wherein said proximity module is further configured to determine a status of a timer in response to said state of said flag having a value representing that said flag is set and to transmit a second message in response to said status of said timer being expired.

18. The system according to claim 13, wherein said proximity module is further configured to determine a status of a timer in response to said state of said flag having a value representing that said flag is set and to determine a subsequent position of said client in response to said status of said timer being un-expired.

19. The system according to claim 13, wherein said client is one of a vehicle, a personal digital assistant, a wireless application protocol telephone, and a laptop.

20. The system according to claim 13, further comprising a network configured to provide a communication channel between said client and said host system.

21. The system according to claim 13, wherein said client comprises a wireless interface.

22. An apparatus for monitoring, comprising;

means for receiving position information related to a notification point;

means for determining a position of a mobile client by said mobile client;

means for setting a state of a flag associated with said notification point to a value representing that said flag is set;

means for comparing said position with an area encompassing said notification point;

means for transmitting a message in response to said position being within said area encompassing said notification points;

means for determining a second position of said mobile client by said mobile client;

means for comparing said second position with a second area encompassing said notification point; and means for transmitting another message in response to said second position being outside of said second area encompassing said notification point and said state of said flag having a value representing that said flag is set.

23. The apparatus according to claim 22, further comprising:

means for resetting said state of said flag to have a value representing that said flag is not set.

24. The apparatus according to claim 23, further comprising:

means for specifying a second radius associated with said second area; and means for transmitting said second radius along with said position information of said notification point.

25. The apparatus according to claim 22, further comprising:

means for initiating a timer.

26. The apparatus according to claim 25, further comprising:

means for specifying a length of said timer; and means for transmitting said length of said timer along with said position information of said notification point.

27. The apparatus according to claim 22, further comprising:

means fur specifying a radius associated with said area; and means for transmitting said radius along with said position information of said notification point.

* * * * *

UNITED STATES PATENT AND TRADEMARK OFFICE

CERTIFICATE OF CORRECTION

PATENT NO. : 6,904,363 B2
APPLICATION NO. : 10/223603
DATED : June 7, 2005
INVENTOR(S) : Inbar et al.

It is certified that error appears in the above-identified patent and that said Letters Patent is hereby corrected as shown below:

Column 9, line 18, "transmitting message" should read -- transmitting a message --

Column 10, line 2, "wavepoint" should read -- waypoint --

Column 10, line 8, "fist" should read -- first --

Column 10, line 29, "maid" should read -- said --

Column 10, line 39, "transmitting message" should read -- transmitting a message --

Column 12, line 37, "fur" should read -- for --

Signed and Sealed this
Thirteenth Day of November, 2012

David J. Kappos
*Director of the United States Patent and Trademark Office*